(12) United States Patent
Miller et al.

(10) Patent No.: US 7,732,955 B2
(45) Date of Patent: Jun. 8, 2010

(54) POWER TOOL WITH MOTOR AIR FLOW PATH CONTROL

(75) Inventors: Phillip T. Miller, Phoenix, MD (US); Brian E. Friedman, Towson, MD (US)

(73) Assignee: Black & Decker Inc., Newark, DE (US)

( * ) Notice: Subject to any disclaimer, the term of this patent is extended or adjusted under 35 U.S.C. 154(b) by 14 days.

(21) Appl. No.: 12/193,206

(22) Filed: Aug. 18, 2008

(65) Prior Publication Data

US 2010/0038979 A1  Feb. 18, 2010

(51) Int. Cl.
*H02K 9/06* (2006.01)
(52) U.S. Cl. .................... 310/63; 310/62; 310/60 R
(58) Field of Classification Search .......... 310/50, 310/60 R, 62, 63, 64, 60 A, 58, 59; 417/243.14
See application file for complete search history.

(56) References Cited

U.S. PATENT DOCUMENTS 3,109,947 A * 11/1963 Thompson et al. ............ 310/64
7,157,818 B2 * 1/2007 Jones .......................... 310/63
2004/0163831 A1   8/2004 Ortt et al.
2004/0217661 A1  11/2004 Frank et al.
2005/0191888 A1   9/2005 Ortt et al.

OTHER PUBLICATIONS

International Search Report and Written Opinion of the International Searching Authority for PCT/US2009/053986, Issued Apr. 5, 2010.

* cited by examiner

*Primary Examiner*—Dang D Le
*Assistant Examiner*—Leda Pham
(74) *Attorney, Agent, or Firm*—Harness, Dickey & Pierce, P.L.C.

(57) ABSTRACT

In accordance with an aspect of the present disclosure, a power tool has an electric motor having a stator disposed in a field case. The stator has field coils having opposed axial ends that extend axially outwardly from opposed axial ends of a lamination stack of the stator. An armature is disposed in the stator and has a shaft on which a fan is disposed. There are gaps between the opposed axial ends of the respective field coils. The fan baffle includes an air direction member that extends into one of the gaps to direct air flow between the armature and the stator. In an aspect, the fan baffle includes a plurality of such members, one for each gap.

8 Claims, 8 Drawing Sheets

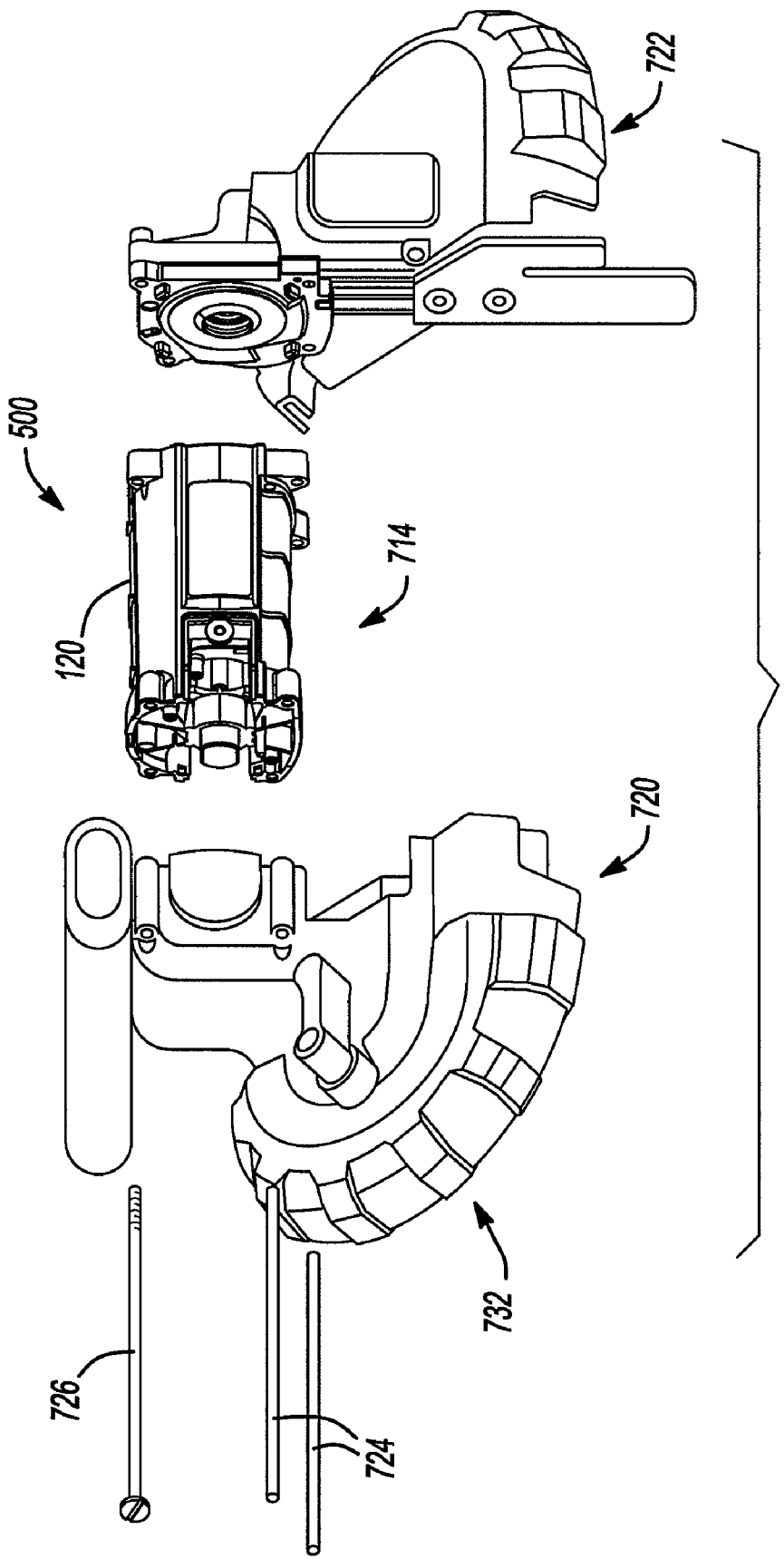

POWER TOOL WITH MOTOR AIR FLOW PATH CONTROL

FIELD

The present disclosure relates to power tools having electric motors.

BACKGROUND

The statements in this section merely provide background information related to the present disclosure and may not constitute prior art.

Power tools often have electric motors that provide the motive power for the power tool. In a number of such power tools, a fan affixed to a shaft of the electric motor provides cooling air flow to the electric motor, and as applicable, to other components of the power tool.

One common type of motor used in power tools is a universal motor. With reference to FIG. 1, a universal motor 100 has a stator 102 and an armature 104 having a shaft 106. Stator 102 includes lamination stack 108 having field coils 110 would in slots (not shown) in lamination stack 108, such as slots around pole pieces 112 of lamination stack 108. A commutator 114 is affixed to a portion of armature shaft 106 extending from one side of lamination stack 108 of stator 102 and a fan 116 is affixed to a portion of armature shaft 106 extending from an opposite side of lamination stack 108. A fan baffle 118 is disposed around fan 116. Armature 104 includes coils 300 (FIG. 3) wound in slots 302 in a lamination stack 304 affixed to armature shaft 106. Ends of the armature coils are connected to segments of the commutator 114. Motor 100 includes a field case or housing 120 in which stator 102 and armature 104 are disposed. Fan baffle 118 is illustratively affixed to housing 120. Opposed ends of armature shaft 106 are disposed in bearings 122, only one of which is shown in FIG. 1.

Each field coil 110 has opposed axial ends 124 extending axially outwardly from opposed axial ends 126 of lamination stack 108 of stator 102. Each field coil 110 illustratively has an arcuate cross-section and opposite circumferential sides of the field coils at each axial end 124 the field coil taper radially outwardly. As such, there are gaps 128 between the circumferential sides of the field coils 110 at opposed axial ends 124 of the field coils. Gaps 128 are generally V-shaped. In motor 100 shown in FIGS. 1 and 2, there are two field coils 110 and there two V-shaped gaps 128 on opposed sides of motor 100 adjacent one axial end 126 of lamination stack 108 and two V-shaped gaps 128 on opposed sides of motor 100 adjacent the other axial end 126 of lamination stack 108.

With reference to FIG. 3, there are two general passages through which air can pass through motor 100. These are passage 306 between the inside of stator 102 and the outside of armature 104 and passage 308 between the outside of stator 102 and the inside of field case or motor housing 120.

As mentioned, motor 100 may illustratively be used in power tools. By way of example and not of limitation, motor 100 may illustratively be used in a band saw 400 shown in FIG. 4, which is illustratively a DeWALT® Heavy-Duty Deep Cut Variable Speed Band Saw, model D28770, manufactured by Black & Decker, Inc. of Towson, Md. Bandsaw 400 includes a first or front section 402 and a second or rear section 404, which can be joined together by a center section 407 in which a motor, such as motor 100, is disposed. Motor 100 is coupled via an output shaft to a saw blade system 406 having a saw blade 408 entrained on wheels (not shown) in front and rear sections 402, 404. Motor 100 drives saw blade system 406.

SUMMARY

In accordance with an aspect of the present disclosure, a power tool has an electric motor having a stator. The stator has field coils having opposed axial ends that extend axially outwardly from opposed axial ends of a lamination stack of the stator. An armature is disposed in the stator and has a shaft on which a fan is disposed. There are gaps between the opposed axial ends of the respective field coils. In an aspect, the fan baffle includes a member that extends into one of the gaps to direct air flow between the armature and the stator. In an aspect, the fan baffle includes a plurality of such members, one for each gap.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 8 is an exploded view of portions of the band saw of FIG. 7.

DETAILED DESCRIPTION

Figure 1:
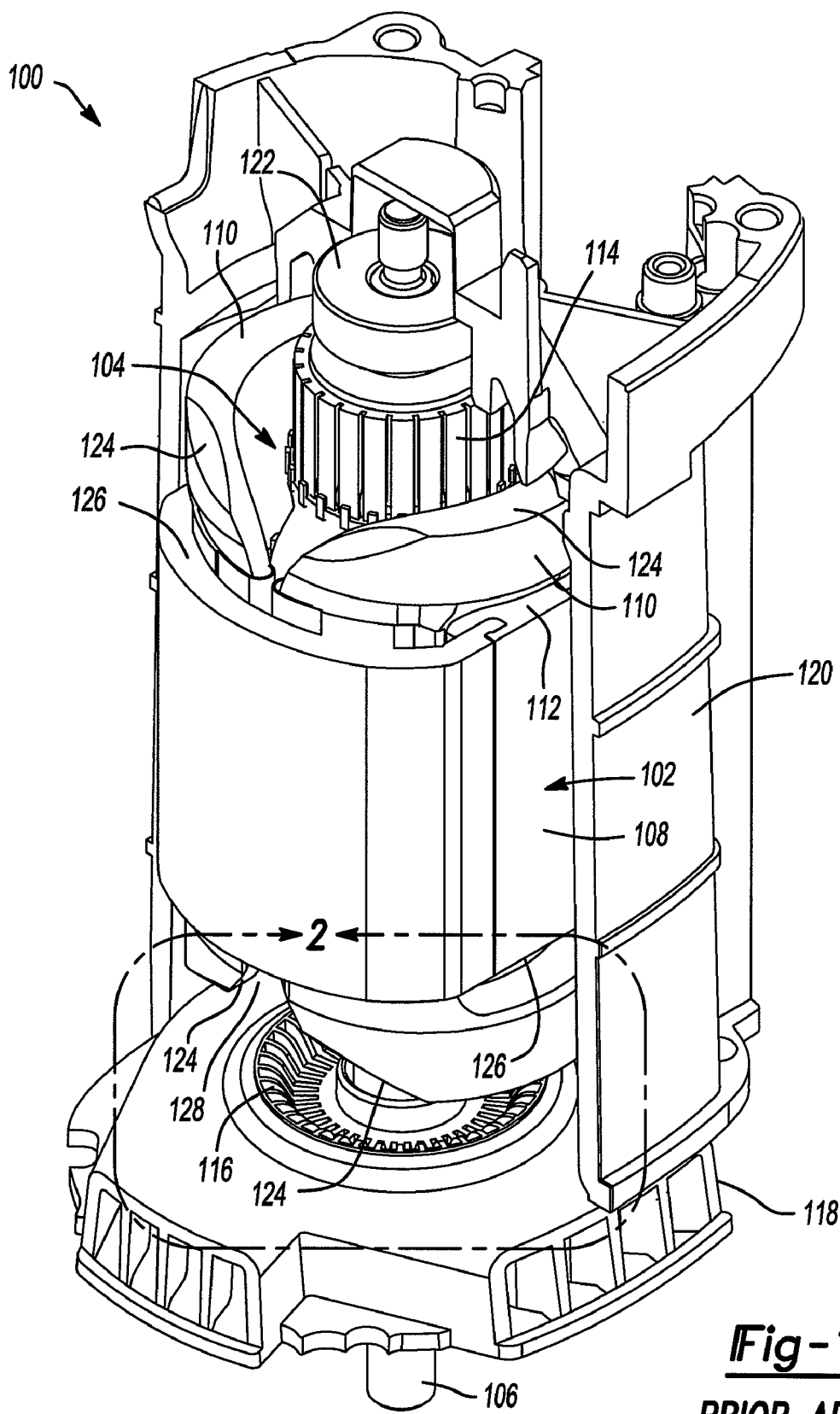
FIG. 1 is a perspective view of a prior art universal motor.
Figure 2:
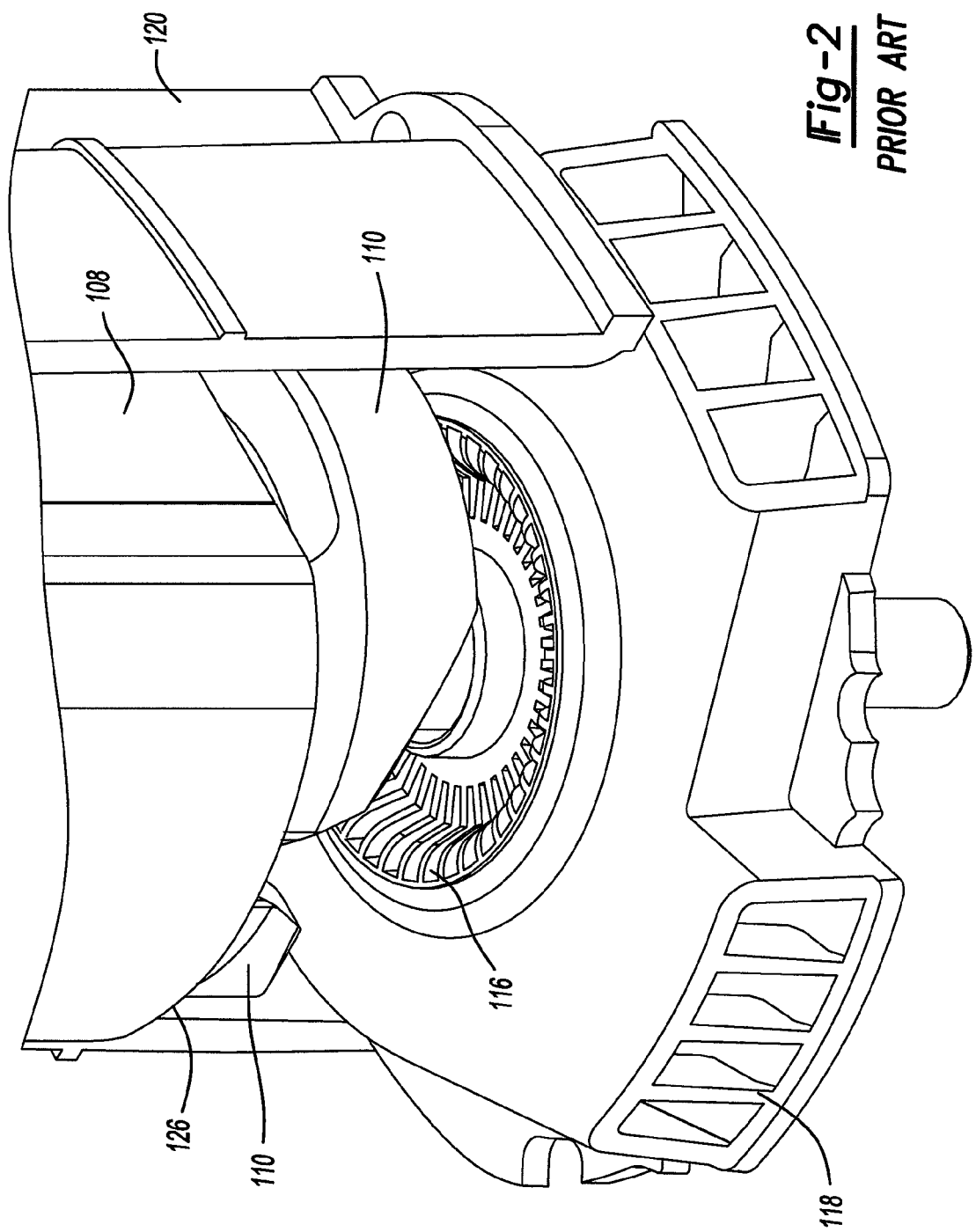
FIG. 2 is a magnified perspective view of the portion of the motor of FIG. 1 taken along the line 2.
Figure 3:
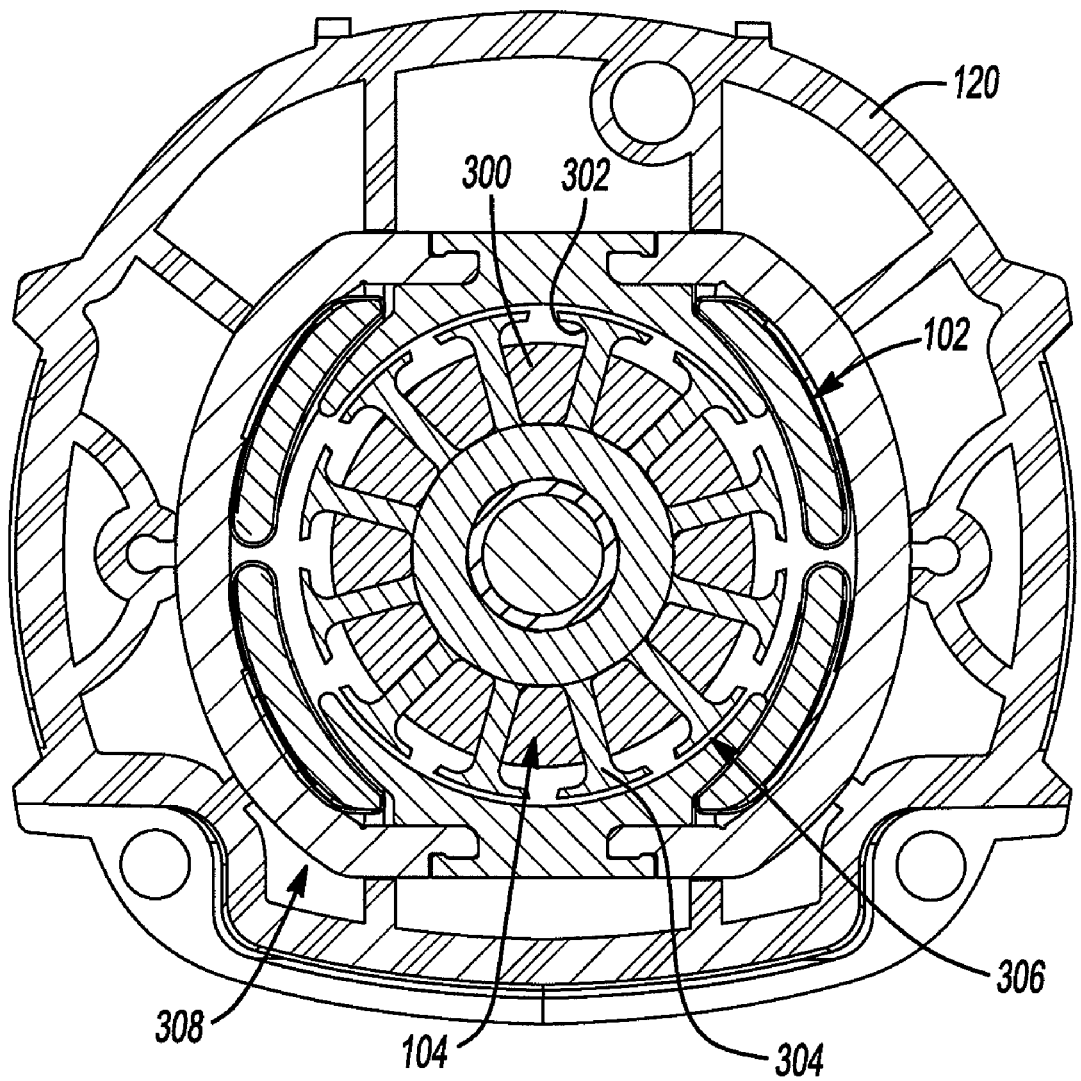
FIG. 3 is a cross-section of the motor of FIG. 1 including a field case.

The following description is merely exemplary in nature and is not intended to limit the present disclosure, application, or uses. It should be understood that throughout the drawings, corresponding reference numerals indicate like or corresponding parts and features.

Figure 5:
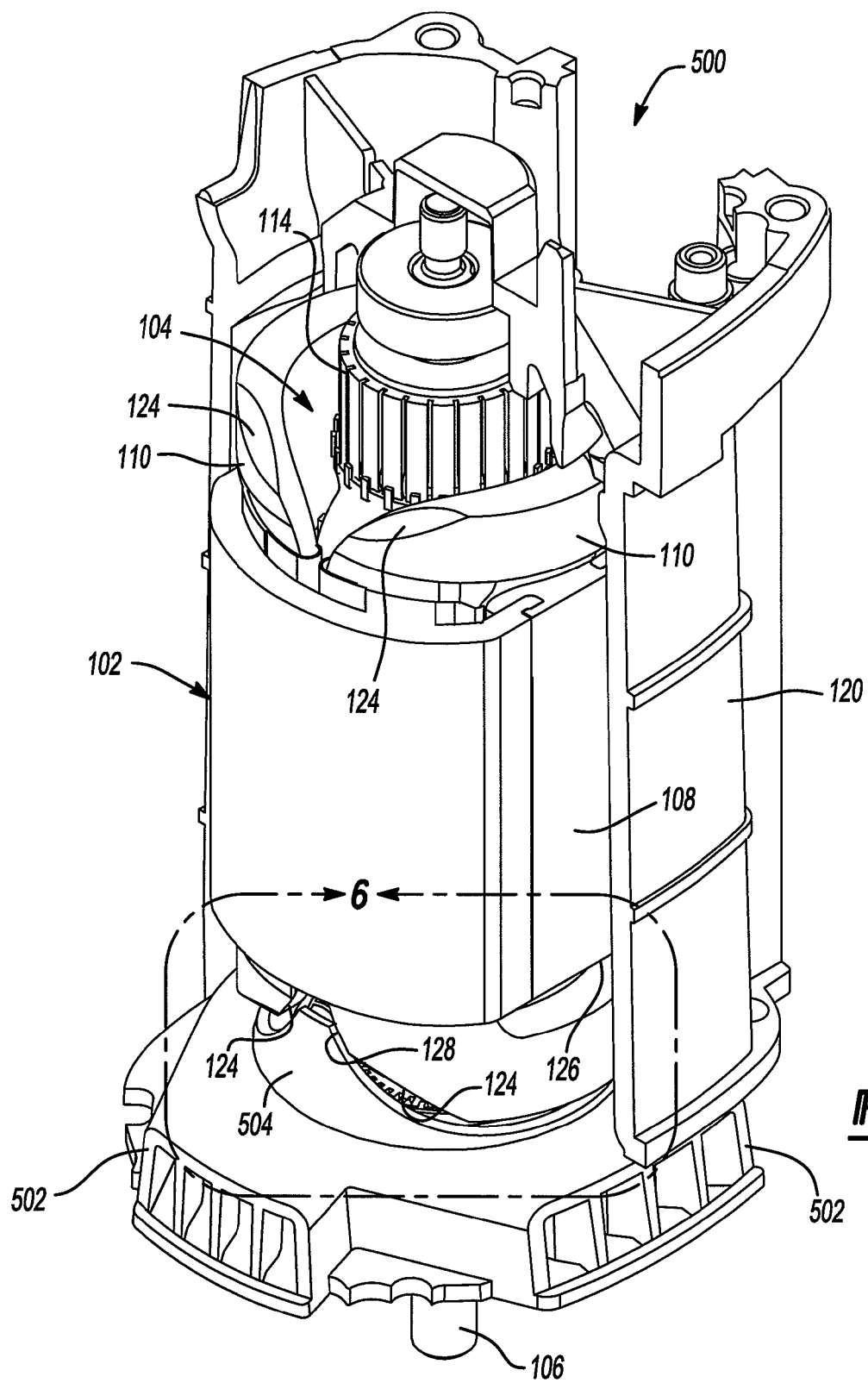
FIG. 5 is a perspective view of a universal motor in accordance with an aspect of the present disclosure.
Figure 6:
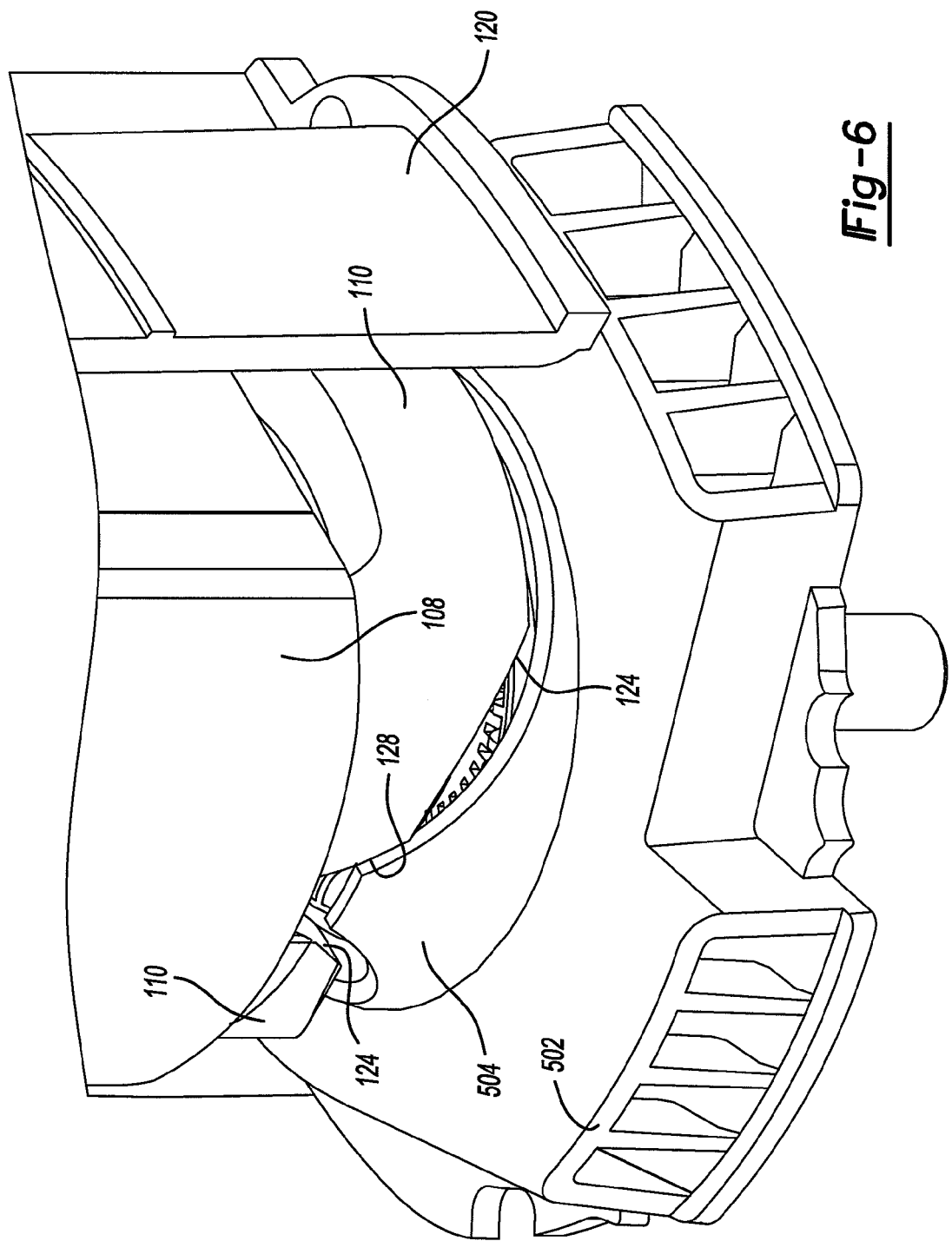
FIG. 6 is a magnified perspective view of the portion of the motor of FIG. 3 taken along the line 5.

With reference to FIGS. 5 and 6, a universal motor 500 in accordance with an aspect of the present disclosure is shown. With the exception of fan baffle 502, motor 500 is the same as motor 100. The discussion of motor 500 will therefore focus on the differences.

Fan baffle 502 includes at least one air flow direction member 504 that extends into one of gaps 128 between respective axial ends of field coils 110. In an aspect, fan baffle 502 includes a plurality of air flow direction members 504, one for each gap between respective axial ends of field coils 110 adjacent the axial end of lamination stack 108 at which fan baffle 502 is disposed. The air flow direction member (or members) 504 restricts air from escaping out of fan baffle 502 through gaps 128 and directs more air to flow between armature 104 and stator 102. This directs more air flow over the armature coils.

Air flow direction member (or members) 504 provide a fixed amount of air restriction to the air passage 308 between the field case 120 and the outside of stator 102 by restricting the air flow out of fan baffle 502 through gaps 128. The shape and size of air flow direction member (or members) 504 can be varied to optimize the proportion of air flow through the passage 306 to passage 308 and fine tune the proportion of cooling air over the armature coils versus the field coils to match the convection cooling effect to the heat generated by each of these components in order to minimize the maximum temperature rise of the hotter component. The shape and size of the air flow direction member (or members) may illustratively be set to direct more air flow onto which of the stator 102 and armature 104 that is hotter when motor 500 is running. The air flow direction member (or members) 504 will also help direct air flow and increase air speed over the armature coils and field coils to better cool motor 500.

Fan baffle 502 having air flow direction member (or members) 504 maximizes cooling of motor 500 to enhance compliance rating and overload capacity. Air flow direction member (or members) 504 also enhance the heat transfer efficiency of the cooling air, reducing the amount of air flow needed to cool motor 500. Less airflow also reduces noise since much of power tool noise is a result of cooling airflow.

By optimizing the air flow mix between passages 306, 308, the amount of air flow required to cool motor 500 can be reduced. By reducing the airflow, noise is also reduced.

In an illustrative aspect, the air flow direction member (or members) is shaped to conform to gap 128 so as to fill most of gap 128.

Figure 7:
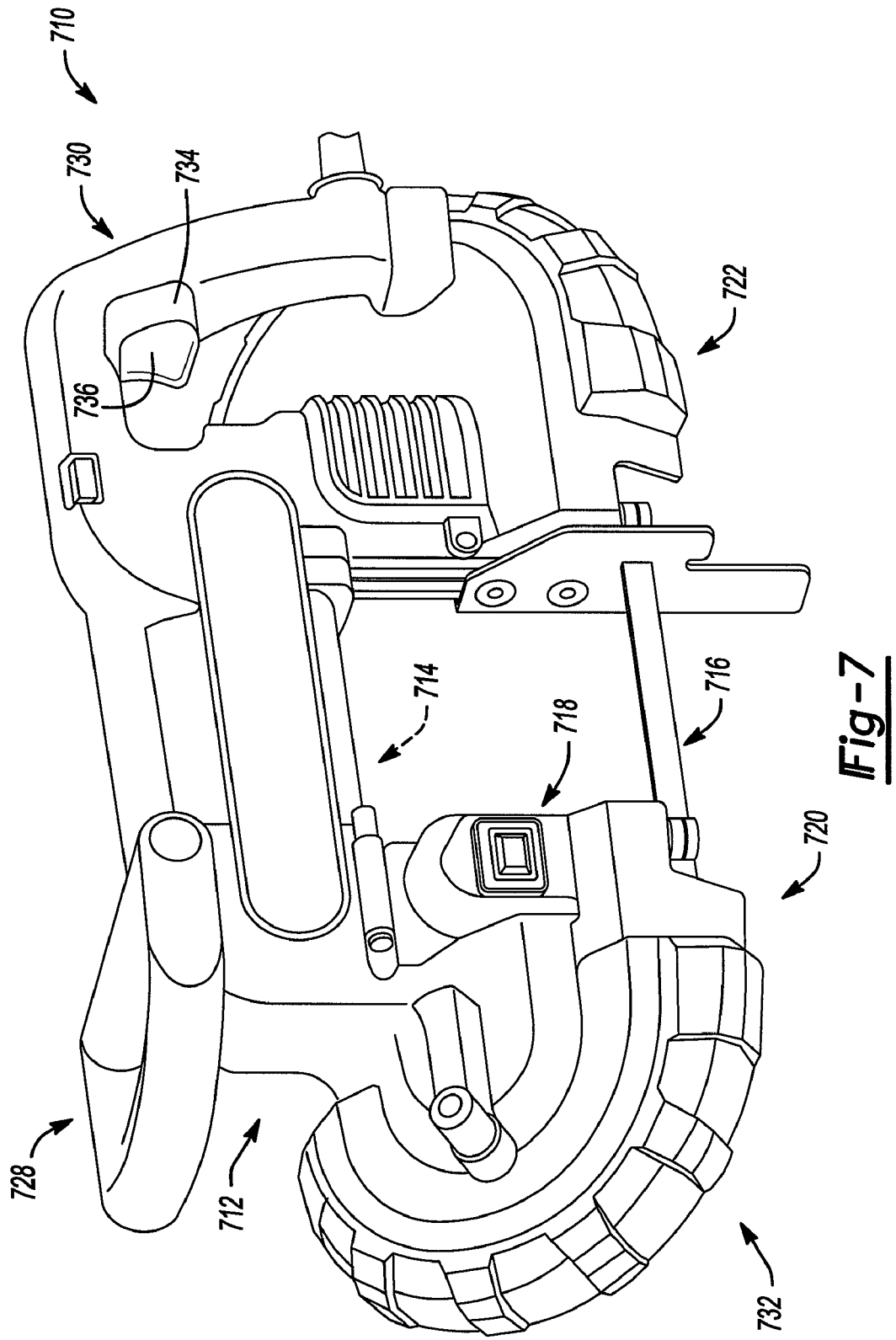
FIG. 7 is a perspective view of a portable band saw having the motor of FIG. 5.

Motor 500 may illustratively be used in power tools. With reference to FIG. 7, a portable band saw 710 includes motor 500. The portable band saw 710 can include a housing 712, a power system 714, a saw blade system 716 and a lighting system 718. The housing 712 can enclose and/or support each of the power system 714, the saw blade system 716 and the lighting system 718. The power system 714 can power the saw blade system 716, such that the saw blade system 716 can cut through the desired structure. The lighting system 718 can illuminate a work surface associated with the cutting operation of the saw blade system 716 to facilitate the operation of the portable band saw 710.

Figure 4:
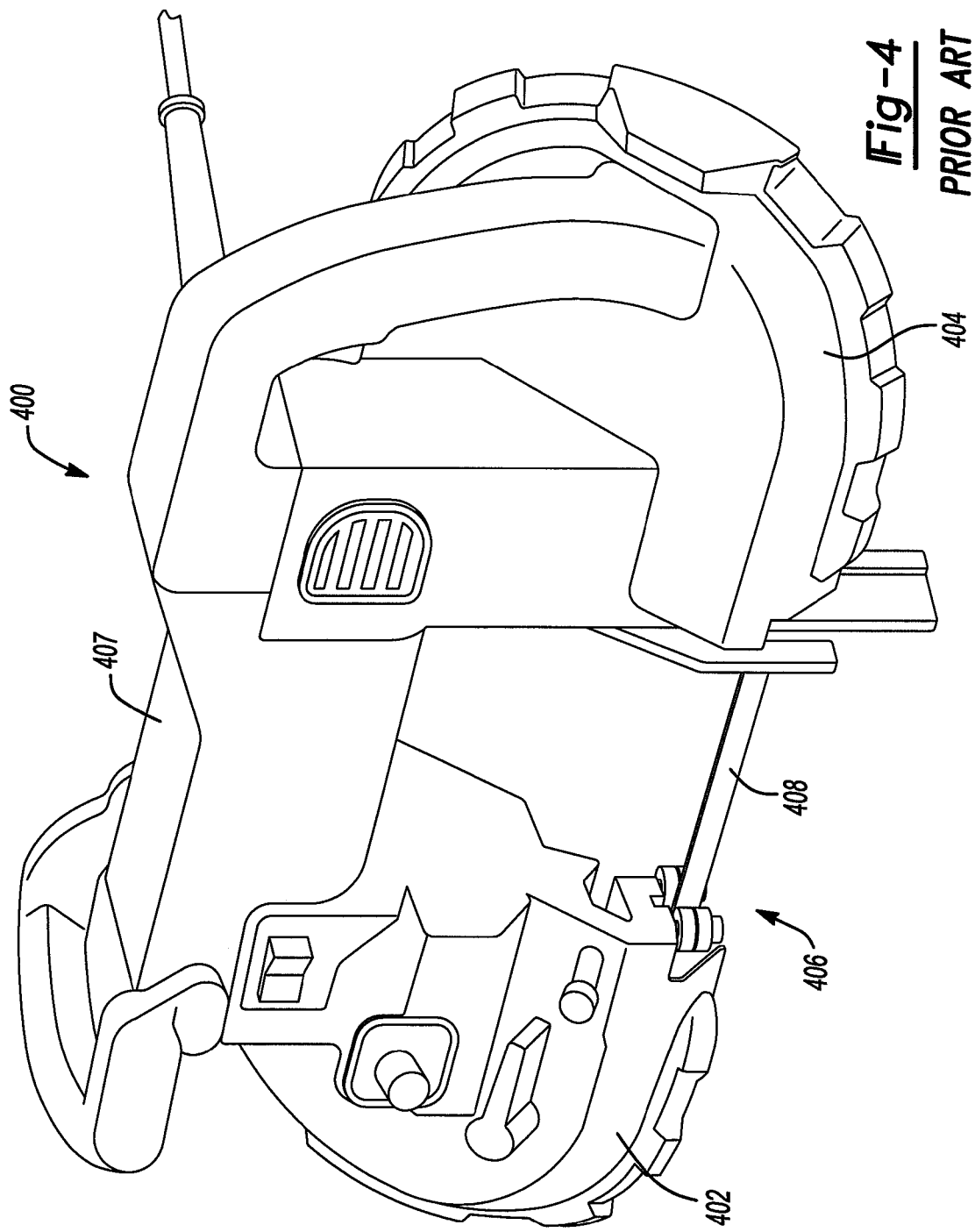
FIG. 4 is a perspective view of a prior art band saw having the motor of FIG. 1.

With reference to FIGS. 7 and 8, the housing 712 of band saw 710 can include a first or front section 720 and a second or rear section 722, which can be joined together by field case 120 of motor 500, one or more compression rods 724 and at least one tension screw/bolt 726. Front section 720 and the rear section 722 of the housing 12 are illustratively substantially similar to front section and rear section of the DeWALT® Heavy-Duty Deep Cut Variable Speed Band Saw, model D28770, shown in FIG. 4. Front section 720 and rear section 722 can be composed of a metal or metal alloy material, and can comprise cast aluminum alloy or magnesium alloy, for example. The front section 720 can include a first or auxiliary handle 728, while the rear section 722 can include a second or trigger handle 730. Each of the front section 720 and the rear section 722 can include a bumper system 732.

The power system 714 can be encased by the housing 712. The power system 714 can drive the saw blade system 716 to cut the work-piece. The power system 714 can include a trigger 734, motor 500 and a control system (not shown). Motor 500 is coupled to the saw blade system 716, such as via an output shaft, to drive the saw blade system 716. As the trigger 734 and the control system can be substantially similar to the trigger and control system of the DeWALT® Heavy-Duty Deep Cut Variable Speed Band Saw, model D28770, shown in FIG. 4, they are not discussed in great detail herein. Briefly, however, the trigger 734 includes an actuator 736 in communication with the control system. The actuator 736 protrudes from the trigger handle 730 to enable a user to activate or deactivate the portable band saw 710 and to control the speed of saw blade system 716 based on how far the user depresses the actuator 736.

What is claimed is:

1. A electric motor, comprising:
   a field case in which a stator and an armature are disposed, the armature disposed in the stator;
   the stator having field coils and the armature having coils;
   the armature having a shaft to which a fan is affixed;
   a fan baffle disposed about the fan;
   the fan baffle having an air flow direction member that extends into a gap between circumferential sides of the field coils at axial ends of the field coils to direct airflow into a passage between the armature and the stator.

2. The apparatus of claim 1 wherein the circumferential sides of the field coils extending axially from an axial end of a lamination stack of the stator to which the fan baffle is adjacent define a plurality of gaps between them, the fan baffle having a plurality of air flow direction members, one for each gap, with each of the air flow direction members extending into a respective one of the gaps.

3. The apparatus of claim 2 wherein the air flow direction members are shaped and sized to optimize a proportion of air flow through the passage between the armature and the stator to air flow through a passage between an outside of the stator and an inside of the field case.

4. The apparatus of claim 2 wherein the air flow direction members are sized and shaped to direct more air flow to whichever of the armature coils or the field coils that run hotter when the motor is operating.

5. A power tool, comprising:
   a member driven by an electric motor, the electric motor, including:
   a field case in which a stator and an armature are disposed, the armature disposed in the stator;
   the stator having field coils and the armature having coils;
   the armature having a shaft to which a fan is affixed;
   a fan baffle disposed about the fan;
   the fan baffle having an air flow direction member that extends into a gap between circumferential sides of the field coils at axial ends of the field coils to direct airflow into a passage between the armature and the stator.

6. The apparatus of claim 5 wherein the circumferential sides of the field coils extending axially from an axial end of a lamination stack of the stator to which the fan baffle is adjacent define a plurality of gaps between them, the fan baffle having a plurality of air flow direction members, one for each gap, with each of the air flow direction members extending into a respective one of the gaps.

7. The apparatus of claim 6 wherein the air flow direction members are shaped and sized to optimize a proportion of air flow through the passage between the armature and the stator to air flow through a passage between an outside of the stator and an inside of the field case.

8. The apparatus of claim 6 wherein the air flow direction members are sized and shaped to direct more air flow to whichever of the armature coils or the field coils that run hotter when the motor is operating.

* * * * *